United States Patent
Fong et al.

(10) Patent No.: US 11,856,409 B2
(45) Date of Patent: Dec. 26, 2023

(54) TRUSTED LOCATION TRACKING

(71) Applicant: PPIP LLC, Chandler, AZ (US)

(72) Inventors: Michael Fong, Chandler, AZ (US); Neric Hsin-wu Fong, Tempe, AZ (US)

(73) Assignee: PPIP, LLC, Chandler, AZ (US)

( * ) Notice: Subject to any disclaimer, the term of this patent is extended or adjusted under 35 U.S.C. 154(b) by 33 days.

(21) Appl. No.: 17/348,756

(22) Filed: Jun. 15, 2021

(65) Prior Publication Data
US 2022/0400383 A1 Dec. 15, 2022

(51) Int. Cl.
*H04W 12/63* (2021.01)
*H04W 12/104* (2021.01)
*H04W 12/03* (2021.01)
*H04W 12/082* (2021.01)
*H04W 12/041* (2021.01)
*H04W 12/069* (2021.01)
*H04W 12/0471* (2021.01)

(52) U.S. Cl.
CPC .......... *H04W 12/63* (2021.01); *H04W 12/03* (2021.01); *H04W 12/041* (2021.01); *H04W 12/0471* (2021.01); *H04W 12/069* (2021.01); *H04W 12/082* (2021.01); *H04W 12/104* (2021.01)

(58) Field of Classification Search
CPC ... H04W 12/63; H04W 12/03; H04W 12/041; H04W 12/0471; H04W 12/069; H04W 12/082; H04W 12/104
See application file for complete search history.

(56) References Cited

U.S. PATENT DOCUMENTS

| | | | |
|---|---|---|---|
| 2009/0023475 A1* | 1/2009 | Chang | H04M 1/72409 455/557 |
| 2015/0249925 A1* | 9/2015 | Haro | H04W 12/126 455/410 |
| 2015/0327208 A1* | 11/2015 | Qiu | H04W 4/02 455/456.1 |
| 2017/0180984 A1* | 6/2017 | Thomas | H04M 1/667 |
| 2019/0349768 A1* | 11/2019 | Fong | H04W 12/37 |
| 2020/0359175 A1* | 11/2020 | Schobel | G08B 21/0283 |
| 2021/0097791 A1* | 4/2021 | Wilkins | G07C 9/00896 |
| 2021/0176066 A1* | 6/2021 | Keith, Jr. | G06F 21/606 |
| 2022/0030022 A1* | 1/2022 | Keith, Jr. | H04W 12/66 |
| 2022/0053283 A1* | 2/2022 | Beaurepaire | H04W 4/029 |

* cited by examiner

*Primary Examiner* — Mohammad W Reza
(74) *Attorney, Agent, or Firm* — Fernando & Partners, LLP

(57) ABSTRACT

In accordance with some embodiments, an apparatus that enables trusted location tracking includes a housing arranged to hold a user equipment, one or more devices, a local communication device, and a controller at least partially supported by the housing. The apparatus obtains, via the one or more devices, a first set of data characterizing a location of the user equipment. The apparatus further establishes, via the location communication device, a local communication channel with the user equipment. The apparatus also obtains through the local communication channel a second set of data characterizing the location of the user equipment. The apparatus also determines a trust score characterizing the second set of data based on the first set of data. The apparatus additionally triggers an alert in accordance with a determination that the trust score is below a threshold.

20 Claims, 6 Drawing Sheets

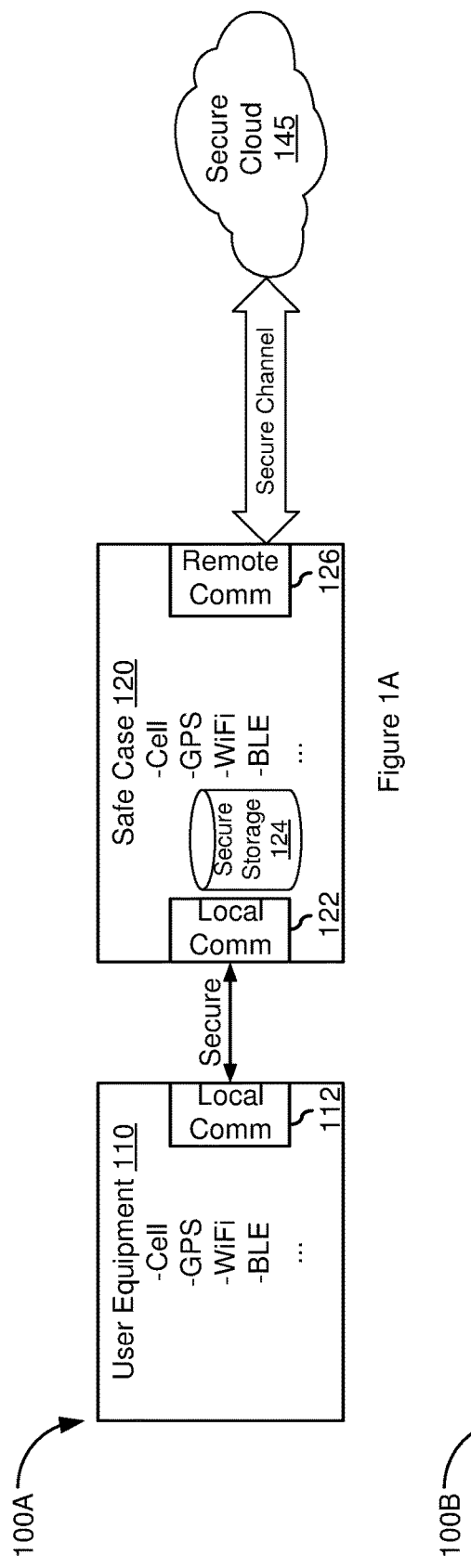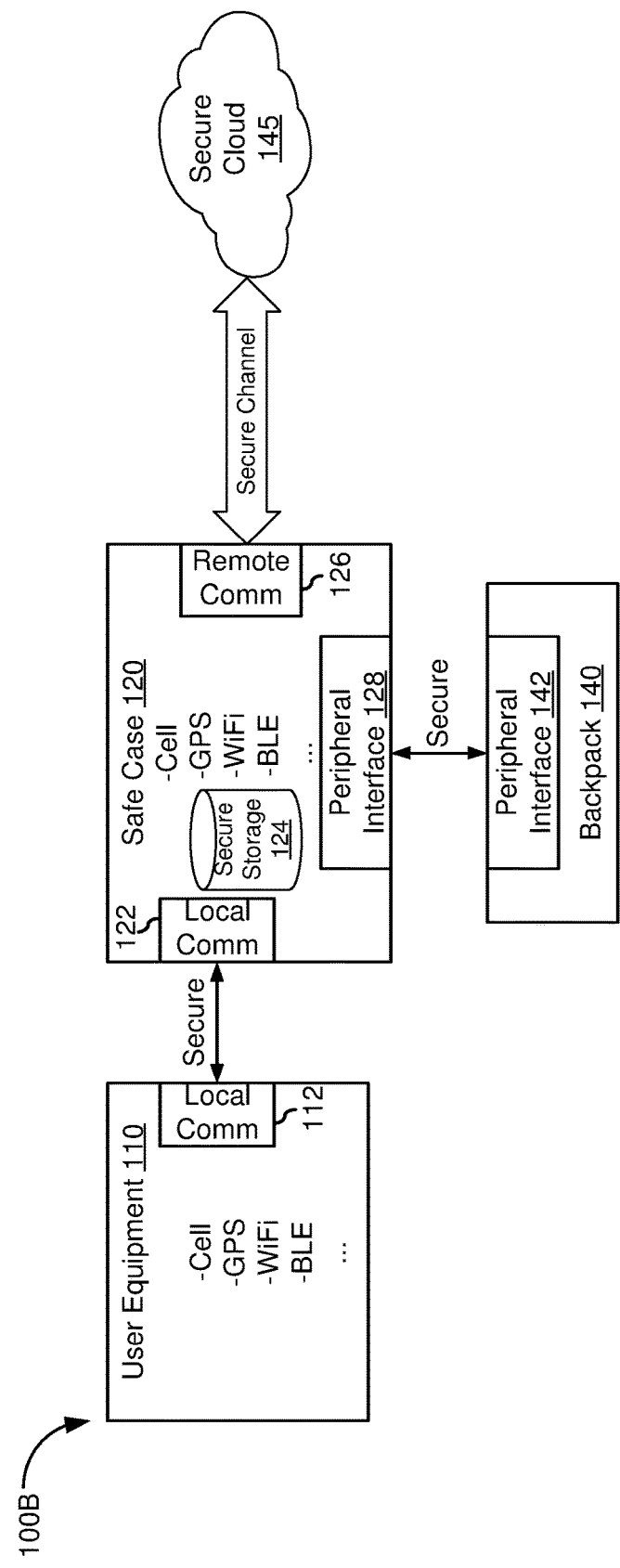

500

| 510 | At an apparatus including a housing arranged to hold a user equipment, one or more devices, a local communication device, and a controller at least partially supported by the housing |
| --- | --- |
| 512 | A secure storage enabling secure communication and trusted application execution |

↓

| 520 | Obtain, via the one or more devices, a first set of data characterizing a location of a user equipment |
| --- | --- |
| 522 | The first set of data characterizing the location of the user equipment includes at least one of cellular data, GPS data, WiFi data, BLE data, image data, audio data, or movement data |

↓

| 530 | Establish, via the location communication device, a local communication channel with the user equipment |
| --- | --- |

↓

| 540 | Obtain through the local communication channel a second set of data characterizing the location of the user equipment |
| --- | --- |

↓

550 Determine a trust score characterizing the second set of data based on the first set of data

| 552 Filter / Randomized Filter (553) | 554 Trust score = a function of (1st set of data, 2nd set of data) | 556 Trust score = weighted function of (1st set of data, 2nd set of data) | 558 Trust score determined by a backpack |
| --- | --- | --- | --- |

↓

560 trusted score < threshold?

- Yes → 570 Trigger an alert
- No → 580 Trusted location data derivation for trusted application

Figure 5A

TRUSTED LOCATION TRACKING

TECHNICAL FIELD

This relates generally to the field of electronic device, and more specifically to an apparatus for secure verification and tracking of location data.

BACKGROUND

Location data yield valuable information and create business opportunities. Many organizations rely on location data for strategic decisions, e.g., tracking inventory and/or locating deliveries, etc. Modern mobile devices are equipped with GPS, where GPS signals from satellites provide location information to mobile devices. To facilitate the location calculation, some services further collect information from WiFi and/or mobile networks as well as sensor data. However, mobile devices are inherently insecure. One can hack into a mobile device to manipulate its sensors and/or communication devices (e.g., WiFi chips, cellular modems, etc.). Further, using low cost and easy to find materials, one can set up a rogue station to spoof GPS data. As such, mobile device location data are prone to attacks and manipulation. Consequently, the location data generated by previously existing mobile location determination methods, devices, and systems may not be reliable and trustworthy for strategic decision making.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 1A and 1B are block diagrams of exemplary trusted location tracking systems in accordance with some embodiments;

FIGS. 5A and 5B are flowcharts illustrating a trusted location tracking method in accordance with some embodiments.

Figure 2:
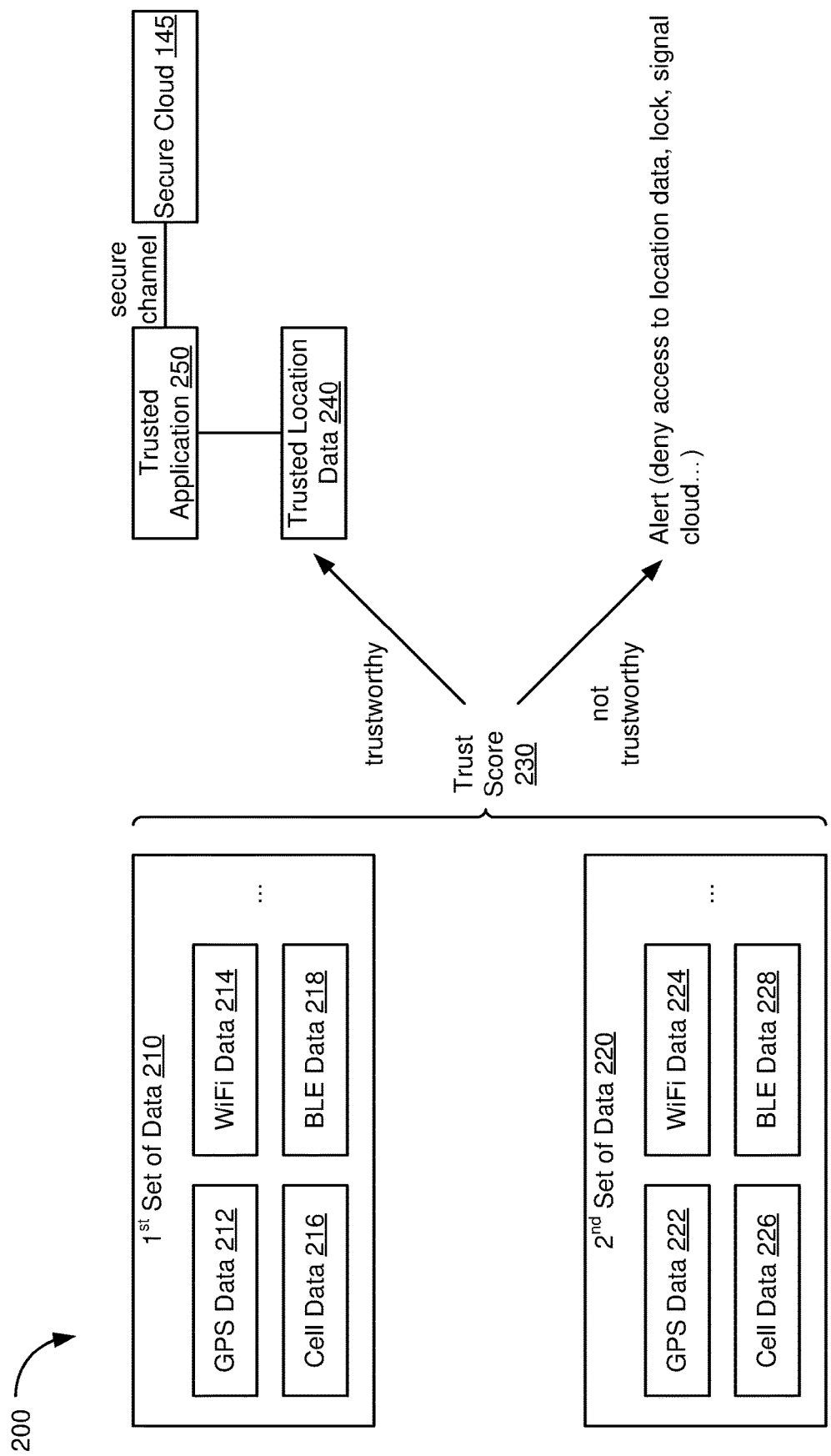
FIG. 2 illustrates an exemplary trusted location tracking process in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

In accordance with various embodiments, the safe case described herein enables trusted location tracking. In some embodiments, the safe case establishes a secure local communication path with a personal communication device. Through the secure local communication path, the safe case obtains one set of data characterizing the location reported by the personal communication device. The safe case also includes sensor(s) and/or communication device(s), e.g., GPS, WiFi, IMU, image, sound, etc., that independently gather another set of data reflecting the location of the personal communication device. The safe case then facilitates the verification of the location of the personal communication device.

For example, the safe case compares the two sets of data and calculates a trust score locally, where the trust score reflects a degree of trustworthiness of the set of data reported by the personal communication device. In some embodiments, the safe case sends the trust score (alternatively, a portion of the two sets of data and/or features extracted from the sets of data) to a secure cloud. Based on the trust score, the safe case (or the secure server directing the safe case) takes appropriate actions to ensure the integrity of the location data. In some embodiments, the safe case further derives trusted location data for trusted location tracking.

Accordingly, safe case disclosed herein in accordance with various embodiments pulls location data from the personal communication device and/or other devices (e.g., network devices). The safe case then provides location validity by validating the location data with its own data and generates the trust score. As such, the safe case provides data integrity and confidentiality (e.g., using secure storage and/or a secure communication channel to cloud). When generating the trusted location data, the safe case uses local data (e.g., computed by the safe case), attached local data (e.g., from a backpack), and/or remote data (e.g., from a server) to perform compute, processing and decision making. The safe case then uses the trust score and/or computed decisions as a factor to control access.

In accordance with some embodiments, a method is performed at an apparatus including a housing arranged to hold a user equipment, one or more devices, a local communication device, and a controller at least partially supported by the housing. The method includes obtaining, via the one or more devices, a first set of data characterizing a location of the user equipment. The method further includes establishing, via the location communication device, a local communication channel with the user equipment. The method also includes obtaining through the local communication channel a second set of data characterizing the location of the user equipment. The method additionally includes determining a trust score characterizing the second set of data based on the first set of data. The method further includes triggering an alert in accordance with a determination that the trust score is below a threshold.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1A, FIG. 1A is a block diagram illustrating an exemplary trusted location tracking system 100A, in accordance with some embodiments. In FIG. 1A, a user equipment (UE) 110 (also known as a personal communication device 110) includes a housing that at least partially supports one or more components. Examples of the user equipment 110 include, but are not limited to, a smartphone, a wearable, a tablet, a laptop, etc.

In some embodiments, the one or more components that are at least partially supported by the housing of the user equipment 110 include communication devices (e.g., one or more local communication devices 112 and remote communication devices), sensors, input/output devices, etc., for obtaining data associated with a location of the user equipment 110. Examples of the one or more components include a WiFi chipset, a Bluetooth (BT)/Bluetooth Low Energy (BLE) chipset, a Near Field Communication (NFC) chipset, a Global Positioning System (GPS), a cellular communication chipset, a Universal Serial Bus (USB) chipset, a physical connector, motion sensor(s), touch sensors and/or force sensors coupled to a touch sensitive surface, sound or acoustic sensors, and/or light sensors, etc. In some embodiments, the motion sensor(s) include, but are not limited to, accelerometers, gyroscopes, magnetometers (e.g., as part of an inertial measurement unit (IMU)), pedometers, and/or barometers.

In some embodiments, the exemplary trusted location tracking system 100 includes a safe case 120, which further includes a housing (e.g., a different housing from the housing of the user equipment 110) that is arranged to receive and hold the user equipment 110. As such, the safe case 120 and the user equipment 110 are distinctive devices in the exemplary trusted location tracking system 100, e.g., the safe case 120 has its own housing, separate from the user equipment 110, and has processing components that are at least partially supported by the housing. In some embodiments, the housing of the safe case 120 supports at least one local communication device 140, so that the safe case 120 can pair with the personal communication device 110 through wired connections or wireless connections.

Different from conventional bases or cases that merely provide structural support, the safe case 120 actively monitors and analyzes the user equipment 110 and takes appropriate actions to protect the user equipment 110 against attacks. Accordingly, the safe case 120 provides enhanced security and protects the privacy of the user of the user equipment 110.

In some embodiments, the housing of the safe case 120 includes a plurality of components mateable with one another. In other words, the plurality of components, once mated with one another, forms a housing assembly to hold the user equipment 110. The housing assembly allows a user to insert the user equipment 110 into the safe case 120 for more security and privacy protection (e.g., in a work mode) or take the user equipment 110 out of the safe case 120 for less monitoring of personal communications by enterprise (e.g., in a personal mode).

In some embodiments, the housing assembly includes one or more moveable components (e.g., a hood and/or a shutter) as well as non-moveable components. For example, the one or more moveable component can slide to one or more positions (e.g., hood up or down or shutter open or close) to mate (e.g., mechanically and/or electronically) with the non-moveable components. In some embodiments, when mated, the one or more moveable and non-moveable components form a partial enclosure at least partially supports and holds the user equipment 110. In some other embodiments, the housing assembly forms a whole enclosure encapsulating the user equipment 110.

In some embodiments, when the one or more moveable components are in the first position, the housing assembly, along with other components of the safe case 120, protects the user equipment 110 against tracking or spying, e.g., by audio jamming, camera covering, and/or RF shielding, etc. When the one or more moveable components of the housing assembly are in a second position (e.g., hood slid up or open shutter), the user can take the user equipment 110 out of enclosure formed by the housing assembly and place the user equipment 110 in a non-protected mode.

In some embodiments, the safe case 120 also includes communication devices and sensors that are at least partially supported by the housing. The communication devices and sensors facilitate independent verification of the data from the user equipment 110. Examples of the communication devices and the sensors on the safe case 120 include, but are not limited to, a WiFi chipset, a BT/BLE chipset, an NFC chipset, a GPS chipset, a cellular communication chipset, a USB chipset, a physical connector, motion sensor(s), an IMU, touch sensors and/or force sensors coupled to a touch sensitive surface, sound or acoustic sensors, and/or light sensors, etc.

In some embodiments, the communication devices on the safe case 120 includes one or more local communication devices 122 and one or more remote communication devices 126. The one or more local communication devices 122 on the safe case 120 are connectable (wirelessly or through a wired connection) with the one or more local communication devices 112 on the user equipment 110. In some embodiment, the safe case 120 includes a controller that facilitates establishing a secure local communication channel between the user equipment 110 and the safe case 120. In some embodiments, through the secure local communication channel, the controller causes transmission of signals to control the communication, processing, data storage, access, and/or other functions of the user equipment 110.

For example, the controller on the safe case 120 can cause transmission of signals through the secure local communication channel to trigger activation or de-activation of the airplane mode on the user equipment 110. When the user equipment 110 is placed in the airplane mode, communications would terminate and RF energy transmission/reception would cease or tune down. On the other hand, when the airplane mode is de-activated, normal communication activities and/or the RF energy transmission/reception would resume.

In some embodiments, the controller of the safe case 120 facilitates establishing a secure remote communication channel with a secure cloud 145 through the one or more remote communication devices 126. In some embodiments, the one or more remote communication devices 126 are at least supported by the housing of the safe case 120. The communication protocols include, for example, WiFi (e.g., IEEE 802.11a, IEEE 802.11b, IEEE 802.11g, IEEE 802.11n, and/or IEEE 802.11ac), BT/BLE, NFC, GPS, and/or cellular communication, including but are not limited to Long-Term Evolution (LTE), Wideband Code Division Multiple Access (W-CDMA), code division multiple access (CDMA), time division multiple access (TDMA), or Global System for Mobile Communications (GSM).

Likewise, though not shown in FIG. 1A, in some embodiments, the user equipment 110 also includes one or more remote communication devices. In some embodiments, under the management of the safe case 120, the secure cloud 145 communicates with the user equipment 110. For example, when permitted by the safe case 120, the secure cloud 145 can securely and directly communicate with the user equipment 110 through the one or more remote communication devices of the user equipment 110. In another example, the safe case 120 securely communicates with the secure cloud 145 through the one or more remote communication devices 126 and securely communicates with the user equipment 110 through the secure local communication channel, e.g., the pairing between the local communication device 112 and the local communication device 122. As such, under the management of the safe case 120, any of the three end points, namely, the user equipment 110, the safe case 120, and the secure cloud 145, can securely communicate with any of the other end points.

In some embodiments, the safe case 120 includes a secure storage 124. The secure storage 124 can store keys for encryption and/or decryption for secure communication. For example, using the keys, the safe case 120 encrypts communications through the secure local communication channel with the user equipment 110, e.g., the secure local communication channel established between the pairing of the local communication devices 122 and 112. In another example, using the keys, the safe case 120 encrypts communications through the secure remote communication channel with the secure cloud 145, e.g., the secure remote communication channel established through the remote communication device(s) 126.

In some embodiments, the secure storage 124 also stores a root key for application and/or process signing. For example, the safe case 120 can provide a hardware root of trust that starts from the hardware layer, e.g., using a specialized system and crypto architecture to create a root key and/or using a hardware true random number generator to derive the root key. The safe case 120 then stores the root key in the secure storage 124. As such, the root key is not exposed and cannot be externally extracted. In some embodiments, the safe case 120 can then generate a certificate signing request within the device. Accordingly, the appropriate certificate (e.g., an X.509 certificate bundle) can be produced, provisioned, and stored within the safe case 120 to maintain stringent control of allowed processes for execution prior to deployment. Thus, the safe case 120 provides a secure execution and communication environment that is rooted in an independent hardware root of trust.

In some embodiments, the safe case 120 also stores location data in the secure storage 124. In some embodiments, when both the safe case 120 and the user equipment 110 are offline, applications can use the location data cached in the secure storage 124. In some embodiments, the secure storage 124 also stores logged events for Enterprise Mobility Management (EMM). For example, even when the safe case 120 and/or the user equipment 110 are offline, the safe case 120 continues monitoring activities of the user equipment 110, including movements of the user equipment 110, and stores data reflecting the activities in the secure storage 124. When the safe case 120 reconnects to the secure cloud 145, the safe case 120 sends the information retrieved from secure storage 124 to the secure cloud 145, e.g., via a secure, encrypted communication channel. As such, strategic decision makers can rely on the trusted location data stored in the secure storage and communicated via the encrypted channel that is rooted in an independent hardware root of trust.

Turning to FIG. 1B, FIG. 1A is a block diagram illustrating another exemplary trusted location tracking system 100B, in accordance with some embodiments. The exemplary trusted location tracking system 100B is similar to and adapted from the exemplary trusted location tracking system 100A shown in FIG. 1A. Elements common to these figures include common reference numbers, and the differences are described herein for the sake of brevity. To that end, in some embodiments, the safe case 120 includes a peripheral interface 128 in addition to the one or more local communication devices 122, the secure storage 124, the one or more remote communication devices 126, sensors, other communication devices, input/output devices, and/or a controller.

In some embodiments, the peripheral interface 128 (also known as a backpack interface) is at least partially supported by the housing of the safe case 120 and connects to a supplemental functional device 140 (also known as a backpack 140). A supplemental functional device or a backpack, as described herein, is a device connectable to the user equipment 110 through the safe case 120 and provides supplemental functions to the user equipment 110. In some embodiments, the backpack 140 is a modular and detachable device, e.g., includes its own housing and is attachable to the housing of the safe case 120. In some embodiments, the backpack 140 snaps onto the back of the safe case 120 in order to be connected to the safe case 120 for added functionalities.

The backpack 140 provides additional hardware and software functionalities to a user of the user equipment 110 and/or the safe case 120. As such, the backpack 140 supplements the functionality of the user equipment 110 and/or the safe case 120. For instance, the backpack 140 can include sensors and/or processors for detecting movements, odor, RF energy, biometric markers, etc. In another example, the backpack 140 can include one or more communication components for communicating with the safe case 120, the user equipment 110, and/or the secure cloud 145.

In some embodiments, the backpack 140 connects to the safe case 120 through its peripheral interface 142, which is connectable to the peripheral interface 128 of the safe case 120. In some embodiments, the peripheral interface 142 connects and/or couples the backpack 140 to the safe case 120, and the local communication device 122 further connects the peripheral interface 128 to the user equipment 110. In some embodiments, to enable the connection to the backpack 140, the housing of the safe case 120 at least partially supports the peripheral interface 128.

For example, the peripheral interface 128 can include a number of connectors (e.g., contact pins or contact pads as indicated by the dots) connectable to the backpack 140. In some embodiments, the connectors are affixed to and at least partially supported by the housing of the safe case 120. The connectors are mateable to the peripheral interface 142 of the backpack 140. In some embodiments, the peripheral interface 128 is wholly supported by the housing of the safe case 120, such that the peripheral interface 128 is integrated with or embedded in the housing surface. In such embodiments, connectors from the backpack 140 can be plugged into the peripheral interface 128 in order to connect the backpack 140 to the safe case 120. It should be noted that at least some components of the backpack 140 can be integrated into the safe case 120 or vice versa. Accordingly, at least some supplemental functions provided by the backpack 140 can also be provided by the safe case 120.

In some embodiments, the peripheral interface 128 is operable to communicate with the backpack 140 via a physical channel established through the connectors. The physical channel forms a secure channel for communication between the safe case 120 and the backpack 140. In some embodiments, the peripheral interface 128 is a wireless interface. In such embodiments, the peripheral interface 128 includes a wireless modem operable to wirelessly communicate with the backpack 140. In some embodiments, the peripheral interface 128 leverages the wireless communication capability of the local communication device 122 to communicate with the backpack 140. For example, the safe case 120 can connect to a wireless communication enabled backpack 140 through a wireless peripheral interface 128 or through a wireless modem of the local communication device 122. As such, a wireless communication-enabled backpack 140 can communicate with the safe case 120 without being in contact with the safe case 120 or physically connected to the peripheral interface 128. Once the backpack 140 is connected or paired with the safe case 120, any one of the four endpoints, namely, the user equipment 110, the safe case 120, the backpack 140, and secure cloud 145 can securely communicate with any of the other end points.

The modular configurations allow a user to expand the functionalities of the user equipment 110 and/or the safe case 120. Once paired, the expanded functionalities provided by the backpack 140 integrate with other operations of the user equipment 110 and/or the safe case 120. The backpack 140 can be easily changed and/or customized to provide different components and functions at different times. For example, in order to facilitate trusted location tracking, a backpack 140 can be attached to the safe case 120 to supplement the location data collection and/or processing. In another example, in order to protect the user equipment 110 from attacks through wireless communication, a backpack 140 can be attached to the safe case 120 to utilize the RF signal processing hardware, firmware, and/or software on the backpack 140 for RF emitter detection. Thus, the backpack 140 provides customizable capabilities for enhanced security and privacy protection of the user equipment 110 and/or the safe case 120.

FIG. 2 illustrates an exemplary trusted location tracking process 200 in accordance with some embodiments. In some embodiments, the controller of the safe case (e.g., the safe case 120 in FIGS. 1A and 1B) obtains a first set of data 210 characterizing the location of the user equipment (e.g., the user equipment 110 in FIGS. 1A and 1B). For example, using the sensor(s) and/or the communication device(s) on the safe case and/or the backpack (e.g., the backpack 140 in FIGS. 1A and 1B), the safe case and/or the backpack collects the first set of data 210. The first set of data 210 is then made available for the controller of the safe case to process.

As shown in FIG. 2, the first set of data 210 can include GPS data 212 (e.g., latitude and longitude coordinates), WiFi data 214 (e.g., received signal strength indication (RSSI), service set identifier (SSID), and/or media access control (MAC) address, etc.), cellular data 216 (e.g., cell tower identifier, etc.), and/or BLE data 218 (e.g., types of emitters, such as a mouse, a keyboard, or a smartwatch, and/or Bluetooth positioning data), etc. In some embodiments, the first set of data also includes image, audio, scent, chemical, heart rhythm, and/or movement data that characterize the location of the user equipment. For example, the first set of data 210 may include image data or sound data captured by image sensors or acoustic sensors, where the image or the sound data may reveal the user equipment 110 at a landmark or at an event, etc. In another example, the first set of data 210 may include biometric readings of the user of the user equipment, e.g., gaits, heart rhythm, plus rate, etc. Signatures, patterns, and/or traits of the biometric reading may show the user at a particular location.

In some embodiments, the controller of the safe case obtains from the user equipment, e.g., through the secure local communication channel, a second set of data 220 characterizing the location of the user equipment. Similar to the first set of data 210, the second set of data 220 can include GPS data 222, WiFi data 224, cellular data 226, and/or BLE data 228, etc. Different from the first set of data 210, which is obtained by the sensor(s) and/or the communication device(s) on the safe case, the second set of data 220 is obtained by the sensor(s) and/or the communication device(s) on the user equipment and communicated to the safe case through the secure local communication channel. In some embodiments, the second set of data 220 from the user equipment also reflects location properties, such as location accuracy and motion states (e.g., stationary, walking, driving, etc.).

In some embodiments, the controller of the safe case further determines a trust score 230 that characterizes the second set of data 220 based on the first set of data 210. In some embodiments, in order to determine the trust score 230, the controller of the safe case compares the first set of data 210 and the second set of data 220, and determines deviations and/or correlations of values in the second set of data 220 from values in the first set of data 210. The controller of the safe case then assigns the trust score 230 as a function of the deviations and correlations.

For example, when the safe case holds the user equipment, the safe case and the user equipment are in close distance, in the range of a few millimeters. Due to the close proximity, the first set of data 210 from the sensor(s) and communication device(s) of an uncompromised user equipment and the second set of data 220 from the sensor(s) and communication device(s) of the safe case match, approximately match, or closely correlate. Accordingly, in some embodiments, the controller of the safe case determines a high trust score 230, e.g., 100% or approximately 100%. The high trust score 230 indicates the trustworthiness of the second set of data 220 from the user equipment. On the other hand, when the differences between the first set of data 210 and the second set of data 220 are significant, e.g., above one or more thresholds, the controller of the safe case assigns a low trust score 230. The low trust score 230 indicates the second set of data 220 from the user equipment is not trustworthy.

In some embodiments, the controller of the safe case assigns weights to the first set of data 210, e.g., assigning one weight to the GPS data 212, another weight to the WiFi data 214, another weight to the cellular data 216, and yet another weight to the BLE data 218, etc. Further, the controller of the safe case assigns weights to the second set of data 220, e.g., assigning one weight to the GPS data 222, another weight to the WiFi data 224, another weight to the cellular data 226, and yet another weight to the BLE data 228, etc. Based on the assigned weights, the controller of the safe case calculates the trust score 230 as a function of the weights, the first set of data 210, and the second set of data 220.

In some embodiments, the controller of the safe case applies rankings and/or a filter during the trust score calculation. In order to make it more difficult to spoof the location data and improve the accuracy of the trust score calculation, the controller can dynamically adjust the weights assigned to elements in the first set of data 210 and the second set of data 220, including assigning zero weights to a subset of the elements to filter out the subset. In some embodiments, the weights are adjusted randomly, based on a statistical method, based on policies stored on the safe case (e.g., in the secure storage 124, FIGS. 1A and 1B) or remotely (e.g., by the secure cloud 145, FIGS. 1A and 1B), and/or based on the first set and the second set of data 210 and 220.

For example, instead of taking into consideration every element from the first set and the second set of data 210 and 220, the controller of the safe case ranks the data, e.g., based on the distance, the signal strength, the amount of activities, and/or the type of activities, in the sets of data 210 and 220 and calculates the trust score 230 based on a subset of the data, e.g., assigning 0 as the weight to the data not in the selected subset. At time $T_1$, for instance, the controller may rank the data associated with WiFi and/or BLE emitters, etc., and then calculate the trust score 230 based on the data associated with top three WiFi or cellular emitters and the top five BLE emitters. At a different time $T_2$ for instance, based on the updated rankings and/or the updated filter configuration, the controller calculates the trust score 230 based on the data associated with top five cellular emitters and the top six BLE emitters. In yet another example, when the BLE signals are poor, during the trust score calculation, the controller may assign less weight or zero weight to the BLE data in the first set and the second set of data 210 and 220. As such, the trust score calculation includes randomness to make it more difficult to spoof the location data and at the same time reduces the data collection and/or processing overhead.

In some embodiments, based on the trust score 230, e.g., the trust score 230 is not below a threshold, the controller of the safe case facilitates deriving trusted location data 240 based on the first set of data 210 and/or the second set of data 220. For example, when the trust score 230 is above a threshold indicating the second set of data 220 is trustworthy, the controller derives the trusted location data 240 from one or more of the GPS data 222, the WiFi Data 224, the Cellular data 226, and the BLE data 228, among others. In another example, when the trust score 230 is above another threshold, the controller determines the first set of data 210 is trustworthy and derives the trusted location data 240 from any one or a combination of the GPS data 222, the WiFi Data 224, the Cellular data 226, and the BLE data 228, among others. In some embodiments, when a user equipment reported location is verified by the safe case, the user equipment reported location is considered trusted. Accordingly, the trust score 230 can be either 0 (indicating not trusted) or 1 (indicating trusted). In some other embodiments, the trust score represents the trustworthiness of and/or the confidence in the second set of data 220, e.g., between 0 to 100%.

When the safe case determines that the trust score 230 indicates the location data is trustworthy, in some embodiments, the controller of the safe case allows one or more trusted applications 250 (e.g., with certificate signing and adequate encryption, etc.) to access the trusted location data 240. For example, some organizations may determine that a third-party application, which shares its data with another entity (e.g., advertisers), is not trustworthy. As such, such organizations use their own trusted application(s) 250 that use the trusted location data 240 for decision making and for communicating with the secure cloud 145 via a secure (e.g., encrypted) channel. In some embodiments, as explained above with reference to FIG. 1A, because the safe case can provide a hardware root of trust, the safe case can maintain the operational integrity of the trusted application 250, e.g., not executing the trusted application 250 for processing and/or communicating the trusted location data 240 unless the certificate for the trusted application 250 is validated, etc.

When the safe case determines that the trust score 230 indicates the location data is not trustworthy, in some embodiments, the safe case takes appropriate actions. For example, the safe case can deny attempted access to the location data, lock the user equipment, signal the secure cloud 145, etc. As will be described below with reference to FIG. 3, the secure cloud 145 can trigger more actions in response to receiving the alert.

In some embodiments, the parameters, e.g., the threshold and/or the weight assignment, for determining the trustworthiness of the reported location data and for deriving the trusted location data 240 are configurable by the safe case and/or the secure cloud 145. For example, based on aggregated information from the secure cloud 145, an area is known to have poor GPS signal. When the safe case is at or near such an area, a larger than discrepancy when comparing the GPS data 212 and 222 associated with a location is considered acceptable and not an indication of intrusion. Accordingly, the threshold for evaluating the trust score 230 at a location within the area can be lowered, so that the trust score is still below the threshold to indicate that the trustworthy of the location data. Further, based on the trust score 230, policies, and/or configurations, the safe case may use WiFi data 214 and/or 224 and/or BLE data 218 and/or 228 to derive more accurate trusted location data 240.

In some embodiments, the subset of data used for calculating the trust score 230 is different from the subset of data used for deriving the trusted location data 240. For example, during the trust score determination, the safe case uses image data and/or audio data from the first and the second set of data 210 and 220 to evaluate the GPS data 222 from the second set of data 220. Having determined the trust score 230 is not below a threshold, indicating the GPS data 222 is trustworthy, the safe case uses the WiFi data 214 and 224 (e.g., signal strength and/or MAC address, etc.) in conjunction with the GPS data 212 and 222 to derive the trusted location data 240. In some embodiments, the selection of the elements from the first set and the second set of data 210 and 220 for deriving the trusted location data 240 is based on a policy and/or the context.

The exemplary trusted location tracking process 200 shown in FIG. 2 is more secure than previously existing location tracking methods and systems. Previously existing location tracking systems often collect location data for the sake of verifying the location data. The trusted location tracking process 200 described herein uses the safe case to help assess the validity of any reported location. Further, different from previously existing location tracking methods and systems, the information gathered by the safe case characterizes the location of the user equipment and is not limited to the GPS, WiFi, and/or BLE location data. For example, by analyzing the type of Bluetooth/BLE emitters, such as a mouse, a keyboard, and/or a smartwatch, the safe case may determine whether the user equipment reported location data that is consistent with the environment in which the user equipment operates. The additional factors the safe case takes into consideration make it more difficult for an adversary to spoof the location data.

Figure 3:
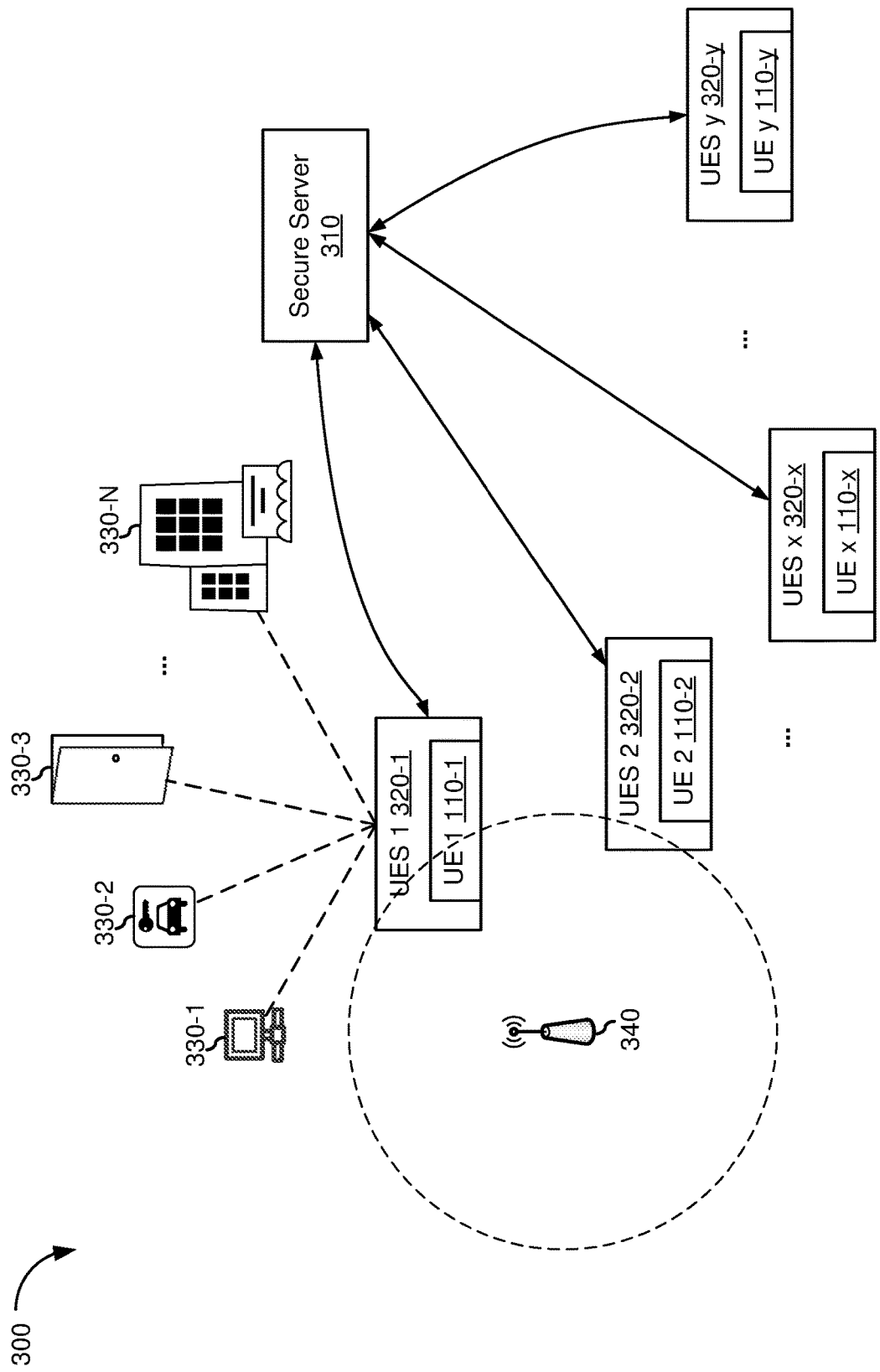
FIG. 3 is a block diagram illustrating an exemplary trusted location tracking platform in accordance with some embodiments.

FIG. 3 illustrates an exemplary trusted location tracking platform 300 in accordance with some embodiments. In some embodiments, the trusted location tracking platform 300 includes a secure server 310 (e.g., as part of the secure cloud 145 in FIGS. 1A-1B and 2). The trusted location tracking platform 300 further includes a plurality of user equipment sniffers (UESs) 320. A respective UES 320 can be a safe case (e.g., the safe case 120 in FIGS. 1A-1B and 2) or a safe case coupled with a backpack (e.g., the backpack 140 in FIGS. 1A and 1B) that receives and holds a respective user equipment 110. Moreover, each user equipment sniffer (UES) 320 monitors and/or sniffs activities on a respective user equipment 110 held by the UES 320 and takes appropriate actions for trusted location tracking. For example, UES 1 320-1 holds and actively sniffs activities associated with UE 1 110-1; UES 2 320-2 holds and actively sniffs activities associated with UE 2 110-2; UES x 320-x holds and actively sniffs activities associated with UE x 110-x; and UES y 320-y holds and actively sniffs activities associated with UE y 110-y, etc.

As described above with reference to FIGS. 1A and 1B, each UES 320 can securely communicate with the secure server 310, e.g., via the remote communication device(s) 126 and using encryption keys derived from the hardware-based root key stored in the secure storage 124. The secure server 310 and/or the UES 320 are also capable of communicating with one or more external devices and systems. For example, as shown in FIG. 3, UES 1 310-1 can communicate with one or more external devices and/or systems 330, which include, but are not limited to, a computing device or system 330-1, a vehicle 330-2, an entrance 330-3, and/or a building 330-N. In some embodiments, the secure server 310 can communicate with the one or more external devices and systems 330, e.g., either directly or via UES 1 320-1.

In some embodiments, the one or more external devices and/or systems 330 leverage the sensors, the communication devices, and/or applications on the user equipment 110 for authentication and authorization. When one UES 320 determines that the location data reported by a respective user equipment 110 held by the UES 320 is not trustworthy, e.g., the trust score is below a threshold, the UES 320 triggers revocation of the access to the external devices and/or systems 330, e.g., logging out from the computer device/system 330-1, ceasing the operation of the vehicle 330-2, closing the entrance 330-3, and/or denying access to the building 330-N.

For example, a legitimate user may use an electronic key to report a location of the entrance 330-3, e.g., a front door, and gain access to the front door upon successful authentication of his identification. An illegitimate user may steal the electronic key, spoof the location data, provide falsified identification, and attempt to open the front door remotely. In such a scenario, the illegitimate user is not actually at the front door 330-3 while trying to gain entry to the front door 330-3. Under the active monitoring by UES 1 320-1, UE 1 110-1, including the electronic key, cannot be used by the illegitimate user to unlock the front door remotely, because UES 1 320-1 determines the location data from user equipment 1 110-1 is not trustworthy and takes actions upon determining the location data is not trustworthy. In accordance with a determination that the location data from the user equipment 1 110-1 is not trustworthy, UES 1 320-1 generates an alert in accordance with some embodiments. In some embodiments, in response to the alert, UES 1 320-1 directs the entrance 330-3 to close. As a result, even with control of the electronic key, the illegitimate user would not be able to gain access to the entrance 330-3.

In some embodiments, a UES 320 coordinates with the secure server 310 to determine if there is any risk, whether to take action(s), and what action(s) to take if necessary. In some embodiments, the UES 320 sends the trust score and/or an alert to the secure server 310. Based on the trust score and/or the alert, the secure server 310 determines, for example, whether to re-configure parameters, whether an anomaly exists, whether the user equipment 110 is hacked, and/or whether the user equipment 110 is approaching a malicious RF emitter 340, etc. In some embodiments, the secure server 310 uses the trust score and/or the alert as part of a trait in a continued multifactor authentication (CMFA) of the user of the user equipment 110, as will be described further in FIG. 4. Further, in some embodiments, the secure server 310, upon receiving the trust score and/or the alert, aggregates across the plurality of UESs 320 in order to determine if similar issues exist in the vicinity.

For example, based on the aggregated information from the plurality of UESs 320, the secure server 310 identifies user equipment 2 320-2 that is within a threshold distance from UES 1 320-1. In case the malicious RF emitter 340 has compromised the user equipment 1 110-1 and causes user equipment 1 110-1 to report false location data, UES 1 320-1 sends an alert to the secure server 310 indicating the location data from user equipment 1 110-1 is not trustworthy. Upon receiving the alert, the secure server 310 may notify UES 2 320-2. UES 2 320-2, in response to receiving the notification, may further gather data associated with the malicious RF emitter 340, add an identification of the malicious RF emitter 340 to a blacklist, and/or analyze the location data reported by user equipment 2 110-2. Accordingly, even if user equipment 2 110-2 has not been compromised by the malicious RF emitter 340, the alert from the secure server 310 generated based on the aggregated information from the plurality of UESs allows UES 2 320-2 proactively protects user equipment 2 110-2 from intrusion.

Figure 4:
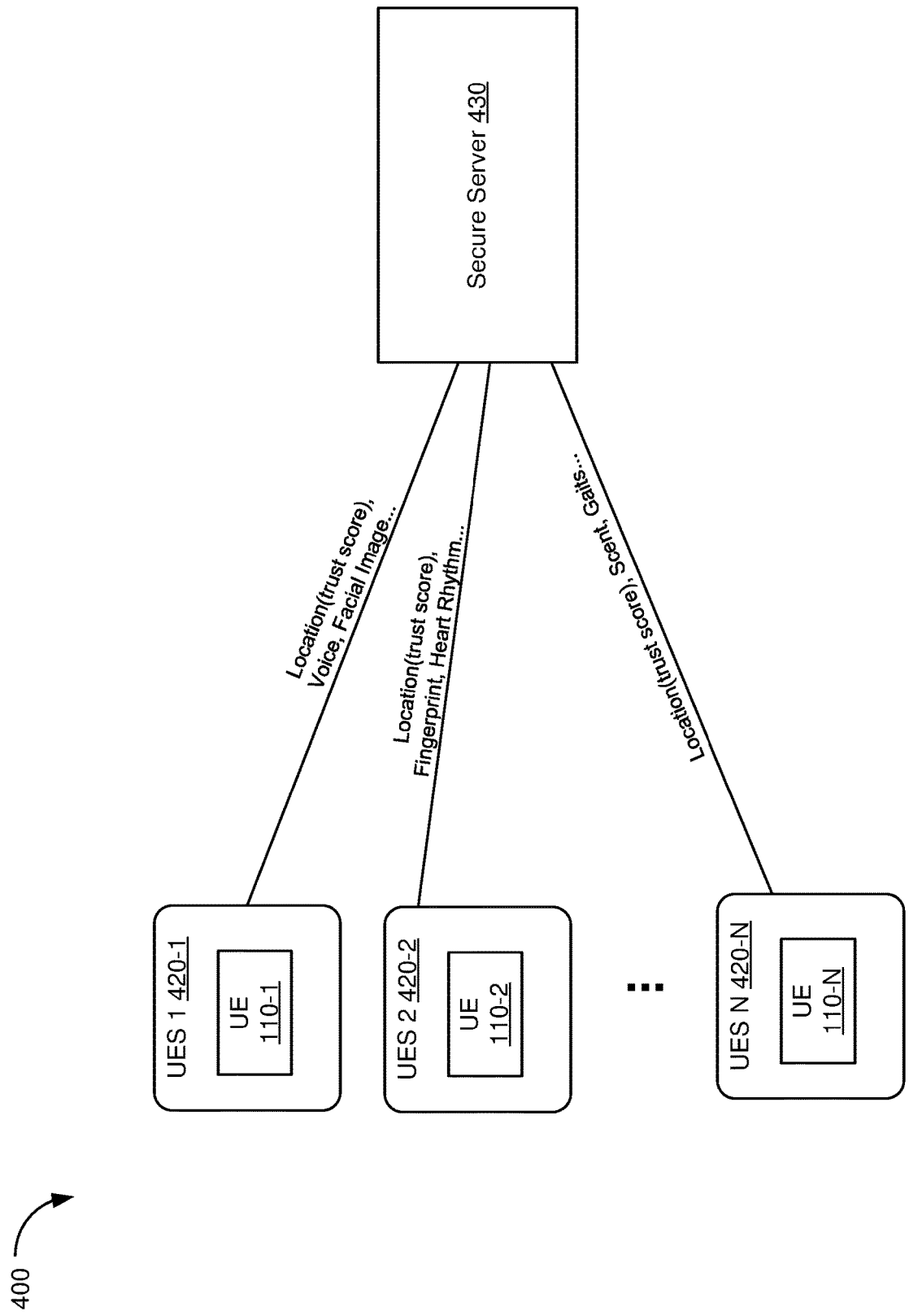
FIG. 4 is a block diagram illustrating a continuous multifactor authentication platform using trusted location tracking in accordance with some embodiments.

FIG. 4 illustrates a simplified block diagram of using trusted location tracking in a secure continuous multifactor authentication (CMFA) platform 400 in accordance with some embodiments. In some embodiments, the secure platform 400 includes a secure server 430 (e.g., the secure server 310 in FIG. 3 and/or as part of the secure cloud in FIGS. 1A-1B and 2). In some embodiments, the secure platform 400 further includes a plurality of UESs 420. Examples of a respective UES 420 includes the UES 320 in FIG. 3, the safe case 120 and/or the backpack 140 in FIGS. 1A and 1B. In some embodiments, each of the plurality of UESs 420 includes one or more sensors and one or more communication devices. The plurality of UESs 420 can collect traits data associated with a user of the user equipment 110. Such traits data includes, for example, heart and/or pulse patterns, gait, fingerprints, voice, odor/scent, facial images, locations, etc., which reflect characteristics of the user and the operating environment. In some embodiments, a respective UES 420 continuously (or periodically) evaluates the traits data and calculates an identifiability score that may change over time depending on the traits data.

As shown in FIG. 4, the trust score reflecting the trustworthiness of the location data can be one of the plurality of traits for calculating an identifiability score of the user of a respective user equipment 110 in the secure CMFA platform 400. In some embodiments, the identifiability score is a function of values assigned to the multiple traits, e.g., a weighted average of the values assigned to the traits. Further, in some embodiments, the respective UES 420 and/or the secure server 430 adjusts the assigned weights based on the traits data, e.g., assigning a higher weight to traits derived from the facial image data when the user equipment 110 is in close proximity to the user, or lowering the weight assigned to the traits data associated with the gaits data when the sensors report that the user is not moving, etc. In some embodiments, based on the identifiability score, the UES 420 and/or the secure server 430 take appropriate actions according to policies, e.g., logging out from or locking the user equipment 110, revoking access to external systems, reporting, logging the event, and/or further actions on other UESs 420 in the vicinity, etc.

In some embodiments, to facilitate the traits data processing, the secure server 430 includes a neural network for machine learning of traits data obtained from the plurality of UESs 420. A variety of machine learning techniques can be used in place of the neural network, including, for example, recurrent neural networks (RNN), random forest classifiers, Bayes classifiers (e.g., naive Bayes), principal component analysis (PCA), support vector machines, linear discriminant analysis, and the like. For the sake of brevity, conventional techniques related to the signal processing and data transmission for obtaining the input data for machine learning and the individual operating components of the machine learning may not be described in detail herein.

For example, during the training phase, the secure server 430 may extract feature vectors representing various traits of a user and learn patterns in the feature vectors. Once trained, the secure server 430 sends the neural network parameters to the plurality of UESs 420. During the authentication phase, features representing the learned patterns are compared with features extracted from the data obtained by a respective UES 420, including the trust score and/or the data associated with the location of the user equipment 110. A significant deviation and/or weak correlation of the trust score may trigger failed authentication of the user and trigger appropriate actions accordingly to policy configuration.

Figure 5B:
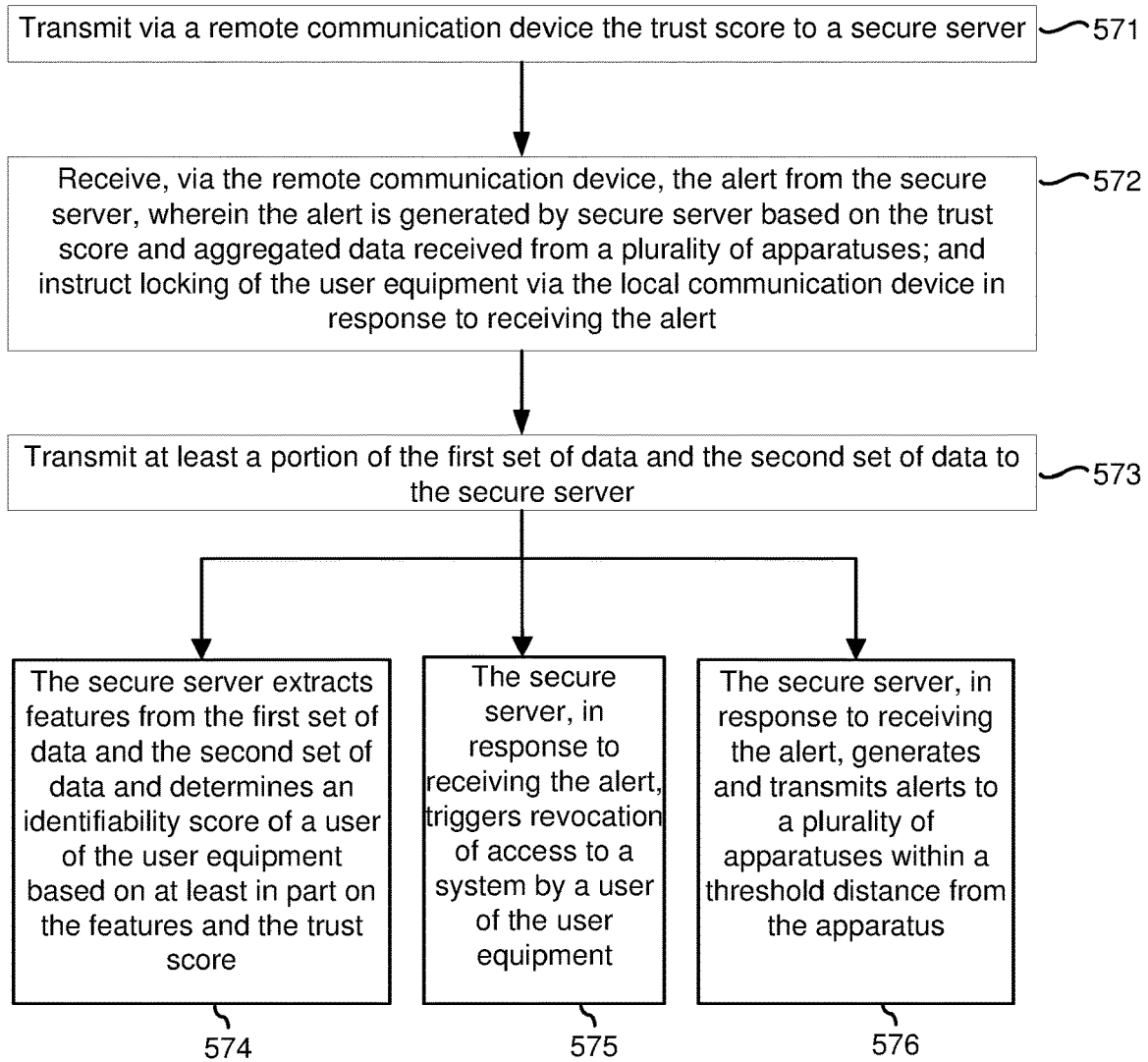

FIGS. 5A and 5B are flowcharts illustrating a trusted location tracking method 500 in accordance with some embodiments. In some embodiments, as represented by block 510, the method 500 is performed at an apparatus (e.g., the safe case 120 in FIGS. 1A and 1B, the backpack 140 in FIGS. 1A and 1B, the UES 320 in FIG. 3, and/or the UES 420 in FIG. 4). In some embodiments, the apparatus includes a housing arranged to hold a user equipment (e.g., the user equipment 110, FIGS. 1A and 1B). Further as represented by block 510, in some embodiments, the apparatus also includes one or more devices (e.g., a GPS chip, a cellular module, a WiFi chip, a BLE chipset, light sensors, acoustic sensors, motion sensors, etc.), a local communication device (e.g., the local communication device 122 in FIGS. 1A and 1B), and a controller. In some embodiments, the one or more devices, the local communication device, and the controller are at least partially supported by the housing.

Further, in some embodiments, as represented by block 512, the apparatus also includes a secure storage (e.g., the secure storage 124 in FIGS. 1A and 1B) that enables secure communication and trust application execution. In some embodiments, the secure storage stores a hardware-based encryption key. In some embodiments, the controller is further operable to encrypt data for communication using one or more encryption keys derived from the hardware-based encryption key. Additionally, in some embodiments, the controller is further operable to store one or more certificates derived from the hardware-based encryption key for one or more trusted applications in the secure storage.

With the secure storage storing the hardware-based encryption key, as shown in FIGS. 1A and 1B, the connections to and from the safe case 120 carry end-to-end encryption. The secure communication capability of the safe case 120 and the secure execution environment on the safe case 120 are useful for users who do not want to rely on untrusted applications (e.g., certain commercial apps that may share data with third party advertising services) for location reporting. Such users may also want the trusted data to be communicated via a secure (e.g., encrypted) channel rooted in an independent hardware root of trust. In some embodiments, in addition to storing the keys for secure communication, the secure storage 124 as shown in FIGS. 1A and 1B can also store events logged for enterprise mobility management. Further, in some embodiments, the secure storage 124 can also store trusted location data (e.g., the trusted location data 240, FIG. 2). When the user equipment 110 and/or the safe case 120 is offline at one point in time, the safe case 120 can retrieve the trusted location data close to the point in time and use the trusted location data as inputs to applications for decision making (e.g., to the trusted application 250, FIG. 2).

Briefly, the method 500 includes obtaining, via the one or more devices, a first set of data characterizing a location of the user equipment; establishing, via the location communication device, a local communication channel with the user equipment; obtaining through the local communication channel a second set of data characterizing the location of the user equipment; determining a trust score characterizing the second set of data based on the first set of data; and triggering an alert in accordance with a determination that the trust score is below a threshold.

To that end, as represented by block 520 in FIG. 5A, the method 500 includes obtaining, via the one or more devices, a first set of data (e.g., the first set of data 210, FIG. 2) characterizing a location of the user equipment. In some embodiments, the one or more devices include at least one of a cellular module, a GPS module, a WiFi module, a BLE module, an accelerometer, a gyroscope, a pedometer, a magnetometer, a barometer, light sensors, and acoustic sensors. Accordingly, as represented by block 522, the first set of data characterizing the location of the user equipment includes at least one of cellular data, GPS data, WiFi data, BLE data, image data, audio data, or movement data.

In other words, different from previously existing location verification methods that merely get location data to verify location data, the trusted location tracking method 520 gathers information that may be associated with a location to help assess the validity of any reported location, e.g., audio, image, movement data, etc. For example, the safe case may analyze internal or external databases of WiFi access points and/or characteristics of the WiFi activities for a particular location to see if the WiFi activities fit the normal pattern for that location. In another example, the safe case may analyze Bluetooth or BLE emitters, e.g., peripherals such as mouse, keyboard, and/or smartwatch, etc., near a particular location to determine if the presence, characteristics, and/or activities associated with the Bluetooth or BLE emitters can be used to validate the location data. Each and every additional factor the safe case analyzes would make it more difficult for an adversary to spoof the location data.

Still referred to the method 500, as represented by block 530, the safe case establishes, via the location communication device, a local communication channel with the user equipment. As represented by block 540, the method 500 continues, with the safe case obtaining through the local communication channel a second set of data (e.g., the second set of data 220, FIG. 2) characterizing the location of the user equipment. As represented by block 550, the method 500 further includes determining a trust score characterizing the second set of data based on the first set of data.

In some embodiments, as represented by block 532, given the amount of data characterizing the location of the user equipment, the safe case applies a filter for improved efficiency and reduced processing overhead during the trust score determination. In some embodiments, the safe case obtains a first subset of data from the first set of data. The safe case then obtains a second subset of data from the second set of data. The safe case further determines the trust score characterizing the second subset of data based on the first subset of data. For example, instead of analyzing all WiFi access points, cellular emitters, and/or BLE emitters associated with a user equipment, the safe case applies a filter to analyze the three WiFi access points with the strongest signal and/or the top five BLE emitters paired with the user equipment most recently. The most recent WiFi access points and/or BLE emitters are more pertinent to mobile location data verification and determination. Thus, the filtering mechanisms are configurable and the safe case can switch to different filters for improved efficiency and accuracy.

In some embodiments, as represented by block 553, to make it more difficult to spoof the location data, the safe case chooses the filter randomly, periodically, or using a statistical method. In such embodiments, determining the trust score characterizing the second set of data based on the first set of data includes first obtaining a third subset of data from the first set of data, different from the first subset of data. The safe case then obtains a fourth subset of data from the second set of data, different from the second subset of data. The safe case further determines the trust score characterizing the fourth subset of data based on the third subset of data. For example, applying different filters, the safe case may choose the top two WiFi access points based on the signal strength and the fifth most active BLE emitter at one time and switches to the top three cellular base stations and the top two recently connected BLE emitters at a different time.

Still referring to FIG. 5A, as represented by block 554, in some embodiments, determining the trust score characterizing the second set of data based on the first set of data includes comparing the first set of data and the second set of data. The safe case then determines deviations and/or correlations of values in the second set of data from values in the first set of data. The safe case additionally assigns the trust score as a function of the deviations and/or correlations. In some embodiments, as presented by block 556, determining the trust score characterizing the second set of data based on the first set of data includes assigning a set of weights to elements in the first set of data and the second set of data, and determining the trust score as a function of the set of weights, the first set of data, and the second set of data. For example, in FIG. 2, in the case that the WiFi data 214 and/or 224 indicate good WiFi signal strength and the cellular data 216 and/or 226 indicate poor cellular signal strength, the safe case may assign more weight to the WiFi data 214 and/or 224 and less weight (or zero weight) to the cellular data 216 and/or 226 when calculating the trust score 230.

In some embodiments, as represented by block 558, a backpack (e.g., the backpack 140, FIG. 1B) is another endpoint in the trusted location tracking system to facilitate the trust score determination. In such embodiments, the safe case further includes a peripheral interface (e.g., the peripheral interface 128 in FIG. 1B) that is connectable to a backpack (e.g., the backpack 140, FIG. 1B). Further in such embodiments, determining the trust score characterizing the second set of data based on the first set of data includes sending to the backpack, via the peripheral interface, data associated with the first set of data and the second set of data. The safe case then causes the backpack to determine the trust score based on the data. Once the backpack determines the trust score, the safe case receives the trust score from the backpack via the peripheral interface.

For example, as explained with reference to FIG. 4, features may be extracted from the data gathered by sensors and/or communication devices on each UES 420 and the respective UE 110. In some embodiments, the safe case may delegate the feature extraction and/or comparison during the neural network processing to the backpack. Through the peripheral interfaces (e.g., the peripheral interfaces 128 and 142, FIG. 1B), the safe case sends the data (or a subset of the data) to the backpack and receives the trust score from the backpack.

Referring back to FIG. 5A, as represented by the decision block 560, the safe case determines whether the trust score is below a threshold. As represented by block 570, if the safe case determines that the trust score is below the threshold ("Yes" branch from the decision block 560), the method 500 further includes triggering an alert. Various embodiments of the alert triggering are described below with reference to FIG. 5B. On the other hand, if the safe case determines that the trust score is not below the threshold ("No" branch from the decision block 560), as represented by block 580, the method 500 includes deriving trusted location data from one or more of the first set of data and the second set of data, and allowing access to the trusted location data by one or more trusted applications.

To ensure that the applications are trusted, in some embodiments, the safe case signs the one or more trusted applications using one or more certificates derived from a hardware-based root key. Prior to executing the one or more trusted applications, the safe case validates the one or more certificates. In some embodiments, the subset of data for deriving the trusted location data is different from the subset of data for calculating the trust score. In some embodiments, based on a first subset of the one or more of the first set of data and the second set of data, the safe case derives the trusted location data. In such embodiments, the trust score is calculated based on a second subset of the one or more of the first set of data and the second set of data, where the second subset is different from the first subset. For example, in FIG. 2, after calculating the trust score 230 based on the first set of data 210 and the second set of data 220, including the GPS data 212 and 222, the WiFi Data 214 and 224, the cellular data 216 and 226, and the BLE data 218 and 228, the safe case may derive the trusted location data 240 from just the GPS data 222.

Turning to FIG. 5B, in some embodiments, the safe case further includes a remote communication device (e.g., the remote communication device 126, FIGS. 1A and 1B). As represented by block 571, in some embodiments, the safe case transmits, via the remote communication device, the trust score to a secure server (e.g., as part of the secure cloud 145 in FIGS. 1A-1B and 2, the secure server 310 in FIG. 3, and/or the secure server 430 in FIG. 4). In such embodiments, as represented by block 572, the secure server generates the alert based on the trust score and aggregated data received from a plurality of apparatuses (e.g., a plurality of safe cases, backpacks, and/or UESs as shown in FIGS. 1A-1B and 2-4) in accordance with some embodiments. Further in such embodiments, triggering the alert in accordance with the determination that the trust score is below the threshold includes receiving, via the remote communication device, the alert from the secure server. In response to receiving the alert, the safe case instructs (e.g., issuing a command or sending a signal) locking of the user equipment via the local communication device. In some embodiments, the actions taken by the safe case also include reporting and/or logging the locking event.

In some embodiments, as represented by block 573, the remote communication device is further operable to transmit the first set of data and the second set of data to the secure server in addition to the trust score. In such embodiments, the secure server extracts features from the first set of data and the second set of data and determines an identifiability score of a user of the user equipment based on at least in part on the features and the trust score. For example, in the CFMA system 400 as shown in FIG. 4, the trust score along with at least a portion of the location data and other traits data (e.g., voice, facial image, fingerprint, heart rhythm, scent, gaits data) are sent from each UES 420 to the secure server 430. The secure server 430 aggregates the information, trains a neural network, and uses features extracted from the traits data to determine an identifiable score of users.

In some embodiments, the controller is operable to cause the remote communication device to at least a portion of the first set of data and the second set of data to the secure server. For example, the safe case may transmit the first set of data and/or the second set of data to the secure server. Alternatively, the safe case and/or the backpack may process the first set of data and/or the second set of data, e.g., extracting features, etc., and a fraction of the first set of data and the second set of data is sent to the secure server.

In some embodiments, as represented by block 574, the secure server, in response to receiving the trust score and at least the portion of the first set of data and the second set of data, extracts features from the first set of data and the second set of data and determines an identifiability score of a user of the user equipment based on at least in part on the features and the trust score. In some other embodiments, as represented by block 575, the secure server, in response to receiving the trust score and at least the portion of the first set of data and the second set of data, triggers revocation of access to a system by a user of the user equipment. In yet some other embodiments, as represented by block 576, the secure server, in response to receiving the trust score and at least the portion of the first set of data and the second set of data, generates and transmits alerts to a plurality of apparatuses within a threshold distance from the apparatus. As such, the secure server uses the trust score to determine access, access conditions, and/or access privileges, among others.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a user equipment;
   one or more devices, at least partially supported by the housing, operable to obtain a first set of data characterizing a location of the user equipment;
   a local communication device, at least partially supported by the housing, operable to establish a local communication channel with the user equipment;
   a secure storage, at least partially supported by the housing, operable to store a hardware-based encryption key, wherein data for communication are encrypted using one or more encryption keys derived from the hardware-based encryption key, and one or more certificates derived from the hardware-based encryption key for one or more trusted applications are stored in the secure storage; and
   a controller, coupled to the one or more devices, the local communication device, and the secure storage, operable to:
      obtain from the user equipment, through the local communication channel, a second set of data obtained by the user equipment characterizing the location of the user equipment,
      determine a trust score characterizing the second set of data obtained from the user equipment paired with the apparatus via the local communication channel based on the first set of data obtained by the one or more devices of the apparatus and a set of weights assigned to elements in the first set of data and the second set of data, and trigger an alert in accordance with a determination that the trust score is below a threshold.

2. The apparatus of claim 1, wherein the one or more devices include at least one of a cellular module, a GPS module, a WiFi module, a BLE module, an accelerometer, a gyroscope, a pedometer, a magnetometer, a barometer, light sensors, and acoustic sensors.

3. The apparatus of claim 1, wherein the first set of data characterizing the location of the user equipment includes at least one of cellular data, GPS data, WiFi data, BLE data, image data, audio data, or movement data.

4. The apparatus of claim 1, wherein determining the trust score characterizing the second set of data based on the first set of data includes:
applying a filter to obtain a first subset of data from the first set of data and obtain a second subset of data from the second set of data; and
determining the trust score characterizing the second subset of data based on the first subset of data.

5. The apparatus of claim 1, wherein determining the trust score characterizing the second set of data obtained by the user equipment paired with the apparatus based on the first set of data obtained by the one or more devices of the apparatus and the set of weights assigned to the elements in the first set of data and the second set of data includes:
comparing the first set of data and the second set of data; and
determining one or more of deviations and correlations of values in the second set of data from values in the first set of data; and
assigning the trust score as a function of the one or more of the deviations and correlations.

6. The apparatus of claim 1, wherein determining the trust score characterizing the second set of data obtained by the user equipment paired with the apparatus based on the first set of data obtained by the one or more devices of the apparatus and the set of weights assigned to the elements in the first set of data and the second set of data includes:
adjusting the set of weights to elements in the first set of data and the second set of data; and
filtering out a subset of the elements for determining the trust score based on a ranking of the elements according to the set of weights.

7. The apparatus of claim 1, further comprising a peripheral interface at least partially supported by the housing and connectable to a supplemental functional device, wherein determining the trust score characterizing the second set of data obtained by the user equipment paired with the apparatus based on the first set of data obtained by the one or more devices of the apparatus and the set of weights assigned to the elements in the first set of data and the second set of data includes:
sending to the supplemental functional device, via the peripheral interface, data associated with the first set of data and the second set of data;
causing the supplemental functional device to determine the trust score based on the data; and
receiving the trust score from the supplemental functional device via the peripheral interface.

8. The apparatus of claim 1, wherein the controller is further operable to, in accordance with a determination that the trust score is not below the threshold:
derive trusted location data from one or more of the first set of data and the second set of data; and
allow access to the trusted location data by one or more trusted applications.

9. The apparatus of claim 8, wherein the controller is further operable to:
sign the one or more trusted applications using one or more certificates derived from a hardware-based root key; and
validate the one or more certificates prior to executing the one or more trusted applications.

10. The apparatus of claim 8, wherein the trusted location data is derived based on a first subset of the one or more of the first set of data and the second set of data, and the trust score is calculated based on a second subset of the one or more of the first set of data and the second set of data, different from the first subset.

11. The apparatus of claim 1, further comprising a remote communication device operable to transmit the trust score to a secure server.

12. The apparatus of claim 11, wherein triggering the alert in accordance with the determination that the trust score is below the threshold includes:
receiving, via the remote communication device, the alert from the secure server, wherein the alert is generated by the secure server based on the trust score and aggregated data received from a plurality of apparatuses; and
instructing locking of the user equipment via the local communication device in response to receiving the alert.

13. The apparatus of claim 11, wherein the controller is further operable to cause:
the remote communication device to transmit at least a portion of the first set of data and the second set of data to the secure server.

14. The apparatus of claim 13, wherein:
the secure server, in response to receiving the trust score and at least the portion of the first set of data and the second set of data, extracts features from the first set of data and the second set of data and determines an identifiability score of a user of the user equipment based on at least in part on the features and the trust score.

15. The apparatus of claim 13, wherein:
the secure server, in response to receiving the trust score and at least the portion of the first set of data and the second set of data, triggers revocation of access to a system by a user of the user equipment.

16. The apparatus of claim 13, wherein:
the secure server, in response to receiving the trust score and at least the portion of the first set of data and the second set of data, generates and transmits alerts to a plurality of apparatuses within a threshold distance from the apparatus.

17. The apparatus of claim 11, wherein the threshold is configurable by the secure server.

18. A method comprising:
at an apparatus including a housing arranged to hold a user equipment, one or more devices at least partially supported by the housing, a local communication device at least partially supported by the housing, a secure storage at least partially supported by the housing and operable to store a hardware-based encryption key, and a controller coupled to the one or more devices, the local communication device, and the secure storage:
obtaining, via the one or more devices, a first set of data characterizing a location of the user equipment;
establishing, via the location communication device, a local communication channel with the user equipment;

obtaining through the local communication channel a second set of data obtained by the user equipment characterizing the location of the user equipment;

determining a trust score characterizing the second set of data obtained from the user equipment paired with the apparatus via the local communication channel based on the first set of data obtained by the one or more devices of the apparatus and a set of weights assigned to elements in the first set of data and the second set of data; and triggering an alert in accordance with a determination that the trust score is below a threshold, wherein data for communication are encrypted using one or more encryption keys derived from the hardware-based encryption key, and one or more certificates derived from the hardware-based encryption key for one or more trusted applications are stored in the secure storage.

19. The apparatus of claim 11, wherein the controller is operable to obtain from the user equipment the second set of data, determine the trust score, and trigger the alert in accordance with the determination that the trust score is below the threshold without communicating with the secure server.

20. The method of claim 18, wherein determining the trust score characterizing the second set of data based on the first set of data includes:

applying a filter to obtain a first subset of data from the first set of data and obtain a second subset of data from the second set of data; and determining the trust score characterizing the second subset of data based on the first subset of data.

\* \* \* \* \*